US012657941B2

(12) United States Patent
Teichmann et al.

(10) Patent No.: US 12,657,941 B2
(45) Date of Patent: Jun. 16, 2026

(54) AI-ASSISTED GENERATION OF ANNOTATED MEDICAL IMAGES

(71) Applicants:Siemens Healthineers AG, Forchheim (DE); Georg-August-Universitaet Goettingen Stiftung oeffentlichen Rechts Universitaetsmedizin Goettingen, Goettingen (DE)

(72) Inventors: Marvin Teichmann, Erlangen (DE); Andre Aichert, Erlangen (DE); Hanibal Bohnenberger, Bovenden (DE)

(73) Assignees: SIEMENS HEALTHINEERS AG, Forchheim (DE); GEORG-AUGUST-UNIVERSITÄT GÖTTINGEN STIFTUNG ÖFFENTLICHEN RECHTS UNIVERSITÄTSMEDIZIN GÖTTINGEN, Göttingen (DE)

( * ) Notice: Subject to any disclaimer, the term of this patent is extended or adjusted under 35 U.S.C. 154(b) by 458 days.

(21) Appl. No.: 18/174,971

(22) Filed: Feb. 27, 2023

(65) Prior Publication Data

US 2023/0282011 A1 Sep. 7, 2023

(30) Foreign Application Priority Data

Mar. 1, 2022 (EP) ..................................... 22159493

(51) Int. Cl.
*G06V 20/70* (2022.01)
*G06V 10/26* (2022.01)
(Continued)

(52) U.S. Cl.
CPC .............. *G06V 20/70* (2022.01); *G06V 10/26* (2022.01); *G06V 10/764* (2022.01);
(Continued)

(58) Field of Classification Search
CPC ...... G06V 20/70; G06V 10/84; G06V 10/774; G06V 10/776; G06V 10/764; G06V 2201/03
See application file for complete search history.

(56) References Cited

U.S. PATENT DOCUMENTS

2021/0375435 A1 * 12/2021 O'Connor .............. G16H 30/20
2023/0342927 A1 10/2023 Aichert et al.

OTHER PUBLICATIONS

Anklin V., Pushpak P.:"Learning whole-slide segmentation from inexact and incomplete labels using tissue graphs". arXiv preprint arXiv:2103.03129, 2021.
(Continued)

*Primary Examiner* — David Perlman
(74) *Attorney, Agent, or Firm* — Harness, Dickey & Pierce, P.L.C.

(57) ABSTRACT

A set of pre-annotated medical images is received, and the received set is processed by automatically: training an AI-based uncertainty model using the received set as training data; processing medical images of the received set by determining classified segments and/or uncertainty regions in the medical images using the trained AI-based uncertainty model; selecting at least a part of the processed medical images including classified segments and/or uncertainty regions based on the processing result; and presenting the selected part of processed medical images to a human expert. Furthermore, a modified received set including additional annotations created by the human expert is received.

20 Claims, 9 Drawing Sheets

(51) Int. Cl.
    *G06V 10/764*      (2022.01)
    *G06V 10/774*      (2022.01)
    *G06V 10/776*      (2022.01)
    *G06V 10/84*       (2022.01)

(52) U.S. Cl.
    CPC .......... *G06V 10/774* (2022.01); *G06V 10/776*
        (2022.01); *G06V 10/84* (2022.01); *G06V*
        *2201/03* (2022.01)

(56) References Cited

OTHER PUBLICATIONS

Shen, Y.; Ke, J.: "Representative Region Based Active Learning for Histological Classification of Colorectal Cancer", in: 2021 IEEE 18th International Symposium on Biomedical Imaging (ISBI)Apr. 13-16, 2021, Nice, France.pp. 1730-1733 doi: 10.1109/ISBI48211. 2021.9433931.

Hanchao, Li et al: "Pyramid Attention Network for Semantic Segmentation"; BMVC 2018.

Nazeri K. et al.:"Two-stage convolutional neural network for breast cancer histology image classification" In International Conference Image Analysis and Recognition, pp. 717-726. Springer, 2018.

Yang, L.; Zhang, Y. et al: "Suggestive annotation: A deep active learning framework for biomedical image segmentation", in: International conference on medical image computing and computerassisted intervention, Springer. pp. 399-407, 2017. https://arxiv.org/pdf/1706.04737.pdf.

Ming Y.Lu, Drew FK et al.:"Data-efficient and weakly supervised computational pathology on whole-slide images". Nature Biomedical Engineering, 5(6):555-570, 2021.

Ström P-et al.:"Pathologist-level grading of prostate biopsies with artificial intelligence" arXiv preprint arXiv:1907.01368, 2019.

Kather J.N. et al.:"Deep learning can predict microsatellite instability directly from histology in gastrointestinal cancer". Nature medicine, 25(7):1054-1056, 2019.

Jin Xu et al:"Reducing the Annotation Cost of Whole Slide Histology Images using Active Learning", 2021 2nd International Conference on Artificial Intelligence and Information Systems, ACMPUB27, New York, NY, USA, May 22, 2021 (May 22, 2021), pp. 47-52, XP058656880, DOI: 10.1145/3469951.3469960 ISBN: 978-1-4503-8980-8 * figures 1, 2, 5 * * sections 3.1-3.3 and 4.1 *.

Sungduk Cho, Jang H. et al.: Deepscribble: Interactive pathology image segmentation using deep neural networks with scribbles. In 2021 IEEE 18th International Symposium on Biomedical Imaging (ISBI), pp. 761-765. IEEE, 2021.

Raczkowski Lukasz et al: "ARA: accurate, reliable and active histopathological image classification framework with Bayesian deep learning", Scientific Reports, [Online] vol. 9, No. 1, Oct. 4, 2019, pp. 1-12, ISSN: 2045-2322, DOI: 10.1038/s41598-019-50587-1, URL:https://www.nature.com/articles/s41598-019-50587-1.pdf [retrieved on Sep. 20, 2021]; XP055842626.

Kather, J.N. et al.:"Pan-cancer image-based detection of clinically actionable genetic alterations", in: Nat Cancer. Aug. 2020 ; 1(8): 789-799. doi:10.1038/s43018-020-0087-6.

Guilherme A. et al.:": BACH: Grand challenge on breast cancer histology images. Medical image analysis", 56:122-139, 2019.

Nagpal K. et al:"Development and validation of a deep learning algorithm for improving gleason scoring of prostate cancer" NPJ digital medicine, 2(1):1-10, 2019.

Redekop, E.; Chernyavskiy, A.:"Uncertainty-Based Method for Improving Poorly Labeled Segmentation Datasets", in: 2021 IEEE 18th International Symposium on Biomedical Imaging (ISBI) Apr. 13-16, 2021, Nice, France., pp. 1831-1835.

* cited by examiner

Figure 2:
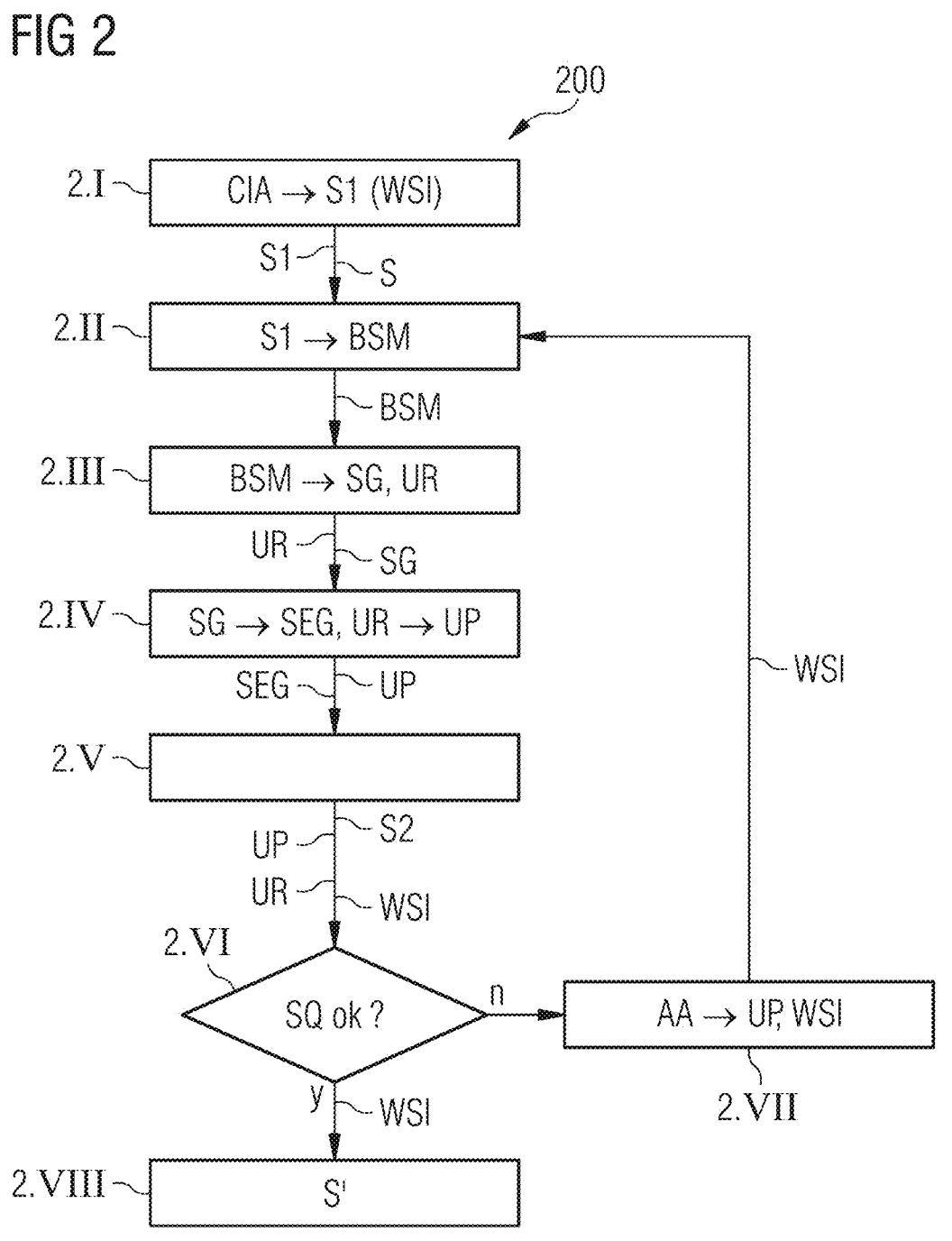

| | |
|---|---|
| 2.I | CIA → S1 (WSI) |

S1 — S

| | |
|---|---|
| 2.II | S1 → BSM |

BSM

| | |
|---|---|
| 2.III | BSM → SG, UR |

UR — SG

| | |
|---|---|
| 2.IV | SG → SEG, UR → UP |

SEG — UP

| | |
|---|---|
| 2.V | |

UP — S2
UR — WSI

2.VI — SQ ok ?

n → AA → UP, WSI    2.VII

WSI y — WSI

| | |
|---|---|
| 2.VIII | S' |

FIG 3

AI-ASSISTED GENERATION OF ANNOTATED MEDICAL IMAGES

CROSS-REFERENCE TO RELATED APPLICATION(S)

The present application claims priority under 35 U.S.C. § 119 to European Patent Application No. 22159493.0, filed Mar. 1, 2022, the entire contents of which are incorporated herein by reference.

FIELD

One or more example embodiments of the present invention relate to a method for AI-assisted generation of annotated medical images. Furthermore, one or more example embodiments of the present invention relate to an annotation assistance device. One or more example embodiments of the present invention also relate to a computer-implemented method for providing a segmented medical image.

BACKGROUND

In the field of digital pathology, processing microscopically enlarged tissue samples as whole slide images, abbreviated by the acronym WSI, has become a standard method for many diagnostic tasks, such as cancer grading, sub-tumor classification or metastasis recognition. An example of a WSI is shown in FIG. 1. Due to their large size and number, WSIs are especially well-suited for data-intensive AI solutions (AI is an acronym for artificial intelligence).

Whole slide imaging, also commonly referred to as "virtual microscopy", aims to emulate conventional light microscopy in a computer-generated manner. Practically speaking, whole slide imaging consists of two processes. The first process utilizes specialized hardware, i.e. a scanner, to digitize glass slides including tissue samples, which generates a large representative image, a so-called "digital slide". The second process employs specialized software, i.e. a virtual slide viewer, to view and/or analyse these large digital files including whole image slides with high resolution.

Most AI based systems processing such WSIs learn to predict a task-specific segmentation as an intermediate computation step. Learning such a segmentation however in a fully supervised fashion requires to collect a large amount of task-specific annotation from a highly trained doctor. Acquiring those annotations is very laborious and expensive.

The most common conventional approach is to have pathologists to annotate all or a large random subset of WSI pixels exact, e.g., by classifying pixels as mask vs. background. Such approaches are described in Jakob Nikolas Kather et al., "Deep learning can predict microsatellite instability directly from histology in gastrointestinal cancer", Nature medicine, 25(7):1054-1056, 2019 and in Jakob Nikolas Kather et al., "Pan-cancer image-based detection of clinically actionable genetic alterations", Nature cancer, 1(8):789-799, 2020. Further information about conventional approaches can be taken from Kamyar Nazeri et al., "Two-stage convolutional neural network for breast cancer histology image classification", in International Conference Image Analysis and Recognition, pages 717-726, Springer, 2018. Also Kunal Nagpal et al., "Development and validation of a deep learning algorithm for improving gleason scoring of prostate cancer", NPJ digital medicine, 2(1):1-10, 2019 and Guilherme Aresta et al.: "Grand challenge on breast cancer histology images", Medical image analysis, 56:122-139, 2019 describe conventional AI-based approaches for segmentation and annotation of WSIs.

These approaches follow the standard supervised learning approach used to solve segmentation in most fields. However, for the very large WSIs with their fine grained structures this approach requires a significant time investment from highly trained doctors, which is very time-consuming and costly.

To achieve the goal of reducing the annotation effort for the pathologist, several methods for label-efficient learning in the space of WSI segmentation have been proposed. Those methods try to utilize as little data as possible. However, these kind of approaches do trade prediction performance towards the goal of reducing costs. Such methods are described in Ming Y Lu et al., "Data-efficient and weakly supervised computational pathology on whole-slide images", Nature biomedical Engineering, 5(6): 555-570, 2021 and in Valentin Anklin et al., "Learning whole-slide segmentation from inexact and incomplete labels using tissue graphs", arXiv preprint arXiv:2103.03129, 2021.

Some patch-based active learning approaches have been proposed. Those methods are able to sample particularly useful patches from the WSIs towards the goal of requesting annotation of those. However, the detailed annotation of smaller patches is much more time consuming than the annotation of larger areas making the practical gain questionable. Such approaches are described in Lin Yang et al., "Suggestive annotation: A deep active learning framework for biomedical image segmentation", in International conference on medical image computing and computer-assisted intervention, pages 399-407, Springer, 2017. Similar information can be taken from Yiqing Shen and Jing Ke, "Representative region based active learning for histological classification of colorectal cancer", in 2021 IEEE 18th International Symposium on Biomedical Imaging (ISBI), pages 1730-1733, IEEE, 2021.

Further, a method which utilizes uncertainty to automatically improving poorly labelled segmentation datasets has been proposed. This can help with the issue by enabling the utilization of public dataset and increasing the annotation throughput of annotators by reducing the annotation quality requirements. Such a method is described in Ekaterina Redekop and Alexey Chernyavskiy, "Uncertainty-based method for improving poorly labeled segmentation datasets", in 2021 IEEE 18th International Symposium on Biomedical Imaging (ISBI), pages 1831-1835, IEEE, 2021.

In Sungduk Cho, Hyungjoon Jang, Jing Wei Tan, and WonKi Jeong, "Deepscribble: Interactive pathology image segmentation using deep neural networks with scribbles", in 2021 IEEE 18th International Symposium on Biomedical Imaging (ISBI), pages, 761-765, IEEE, 2021 an interactive annotations system for WSI following a similar idea is described. The system automatically tries to refine annotations of pathologists on the fly while they are annotating the data, making the annotation potentially easier.

In addition, it has been tried to avoid manual labelling at all by using semi-manual approaches based on unsupervised segmentation like Laplace filtering. Such a method is described in Peter Ström et al., "Pathologist-level grading of prostate biopsies with artificial intelligence", arXiv preprint arXiv: 1907.01368, 2019.

SUMMARY

The inventors have identified a problem of reducing the manual annotation effort and improving the quality of annotated image data such that an AI-based segmentation function trained by the annotated imaged provides more exact results.

At least the above-mentioned problem is solved by a method for AI-assisted generation of annotated medical images, by an annotation assistance device, and by a computer-implemented method for providing a segmented medical image, according to one or more example embodiments of the present invention.

In the method for AI-assisted generation of annotated medical images, according to an embodiment of the present invention, in a step i) a set of pre-annotated medical images is received preferably by an annotation assistance device which automatically implements the method according to an embodiment of the present invention. As later described, the medical images preferably include tissue image data, from a creature, more preferred a human patient. As also later described, the medical images most preferably comprise so called whole slide images. As mentioned above, these whole slide images emulate conventional light microscopy in a computer-generated manner. The annotations of the medical images are generated by a human expert. Annotations include human made classifications of subareas of medical images. In other words, an annotation in the context of embodiments of the present invention means a graphical mark and/or a classification of a region of a medical image. For example, the graphical mark is realized by a closed line surrounding the annotated region and the colour of the closed line classifies the annotated region. Preferably, cancerous subareas without cancer, preferably colon cancer, and completely healthy subareas are marked or delineated, preferably drawn, in medical images by a human expert and are preferably marked with differently designed boundary lines, preferably with boundary lines with different colours.

As later described in detail, the medical images need not be annotated completely in advance. It is sufficient that first of all, at least a part of the set of medical images is cursorily and sparsely provided with annotations. That means that these annotations need not be exact as to their extent, it is enough if the regions to be annotated are partly marked by the annotations and merely a part, i.e. a subset of the medical images and also merely a subset of the regions to be annotated are annotated by the human expert in advance.

However, it is preferred that the annotations are tissue exact. That means that the classification of annotated regions is correct. For example, cancerous tissue is correctly identified and also non-cancerous tissue is correctly identified. Hence, much time and effort can be saved by only coarsely annotating the medical images by the human expert. Hence, coarsely annotating means that the annotations are performed cursorily and sparsely but correctly.

In a step ii), after reception of the set of annotated medical images, the received set is processed by automatically performing a training step, a determination or processing step and a selection and presentation step. The training step comprises a training of an AI-based uncertainty model using the received set as training data.

Typically, the training basis of an AI-based uncertainty model does not include all kind of possible input data for the AI-based model. Such a deficit leads to a so-called epistemic uncertainty. In contrast to aleatoric uncertainty, epistemic uncertainty is based on a lack of knowledge. Aleatoric uncertainty is related to a statistical or irreducible uncertainty. In the whole application, the expression "uncertainty" has to be understood as epistemic uncertainty. Epistemic uncertainty is also known as systematic uncertainty, and is due to things one could in principle know but does not know in practice.

An uncertainty model is trained to generate classified segments as proposals for annotations and determining an uncertainty of the segmentation and classification. For example, images or even regions with high uncertainty are determined. Images or regions with high uncertainty include regions which the model is not be able to segment with enough high reliability. A high uncertainty means that there are not enough reliable training data as basis for training the AI-based uncertainty model for determining segments in the related medical images. Uncertainty can be determined by extracting feature data at different layers of the uncertainty model and determining a statistical distribution based on these data. Then, uncertainty can be calculated as standard deviation of the mentioned statistical distribution. Details and different variants of approaches for implementing the determination of uncertainty are described later in the description.

The determination or processing step comprises a determination of classified segments and/or uncertainty regions in the medical images of the received set using the trained uncertainty model. The selection and presentation step includes selecting at least a part of the processed medical images based on the processing result and presenting the selected part of the processed medical images to a human expert. Preferably, those medical images or parts of images which have the highest degree of uncertainty are presented to the human expert. Hence, selecting at least a part of the processed medical images means that at least one region, i.e. one subarea, of at least one processed medical image is selected.

Images comprising high uncertainty are very difficult to automatically segment. In these cases, a human expert is in general more appropriate for determining annotations in these selected medical images.

The selection of medical images of high uncertainty can be used to draw the human expert's attention to medical images that he should prioritized annotate, since these annotations are particularly relevant for improving the uncertainty model as training data.

After the human expert has drawn in additional annotations based on the hints automatically given to him, in step iii), the modified set, including the additional annotations created by the human expert and related to the selected part of the processed medical images, is received by the above-mentioned annotation assistance device. The annotation assistance device may use the received additional annotations for starting a second round of an automatic processing including training the AI-based uncertainty model, a determination step and a selection and presentation step, or in case the annotations exceed a predetermined quality threshold, the annotated medical images are output for any application.

Advantageously, the method according to an embodiment of the present invention enables to avoid complete pixel-exact annotation of all medical images for generating completely annotated medical images and enables to display uncertainty regions which are most effective to annotate by the human expert in order to maximize the utility of any further annotation. Hence, the human expert is automatically guided to annotate the most effective additional medical images and possibly regions on these medical images. The advantageous approach leads to massive saving of time and cost when annotating medical images compared to the traditional approach of annotation without the automatic support. The method is also appropriate for automatically sampling hard and informative examples. In this way, a strong dataset is provided for a training of a segmentation model. It has been shown that training with selected hard examples of training data is much more effective than training with a large amount of data, wherein most of the data correspond to easy cases. Further, the method according to an embodiment of the present invention ensures high quality and noise-free and correct annotation at any step of the annotation process.

Further, the method for AI-assisted generation of annotated medical images, preferably includes the step of a training of an AI-based uncertainty model and/or an AI-based segmentation model based on the modified received set. The modified received set can be used as labelled training data. That means that for training, a version of the received set without annotations or with only pre-annotations is used as input data and the modified received set is used for evaluation of output data. The AI-based uncertainty model includes the above-mentioned AI-based uncertainty model of step ii) of the method for AI-assisted generation of annotated medical images, trained by the received set of pre-annotated medical images. However, the AI-based uncertainty model can also comprise a different AI-based uncertainty model. Advantageously, the resulting AI-based uncertainty model and/or an AI-based segmentation model is trained based on an improved training set and are therefore trained more accurately and less error-prone compared to the use of a conventionally generated annotation data set as labelled training data.

The computer implemented method for providing a segmented medical image comprises the steps of receiving a generated medical image, determining a segmented medical image by processing the generated medical image by a trained AI-based segmentation model provided by the method of AI-assisted generation of annotated medical images including the step of a training of an AI-based uncertainty model and/or an AI-based segmentation model based on the modified received set. Advantageously, the resulting AI-based uncertainty model and/or AI-based segmentation model is trained based on an improved training set and are therefore trained more accurately and less error-prone compared to the use of a conventionally generated annotation data set as labelled training data. By computer implementation, the method for providing a segmented medical image can be flexibly performed in any computing system and without any intervention of a human person.

The annotation assistance device according to an embodiment of the present invention comprises a communication interface for receiving a set of annotated medical images. The annotation assistance device according to an embodiment of the present invention also includes a model training unit for training an uncertainty model using the received set as training data.

Part of the annotation assistance device according to an embodiment of the present invention is also a determination unit for determining classified segments and/or uncertainty regions using the trained uncertainty model in the received set.

The annotation assistance device according to an embodiment of the present invention also comprises a selection unit for selecting at least a part of the processed medical images based on the results of the determination step. As later described, additionally, also classified segments and/or determined uncertainty regions can be selected to give a human expert a more detailed information about regions to be examined more accurately in particular medical images.

The above mentioned communication interface of the annotation assistance device is also arranged for presenting the selected medical images, preferably the classified segments and/or determined uncertainty regions, to a human expert and for receiving a modified received set including additional annotations created by the human expert.

An annotation assistance device, according to an embodiment of the present invention comprises at least one processor configured to execute computer-executable instructions to cause the annotation assistance device to: train an AI-based uncertainty model using a set of pre-annotated medical images as training data; determine at least one of classified segments or uncertainty regions in medical images of the set of pre-annotated medical images using the trained AI-based uncertainty model; select at least a part of the medical images including the at least one of the classified segments or the uncertainty regions; present the part of the medical images to a human expert; and receive a modified set of pre-annotated medical images including additional annotations created by the human expert, the additional annotations being related to the part of the medical images.

The annotation assistance device according to an embodiment of the present invention shares the advantages of the method for AI-assisted generation of annotated medical images according to an embodiment of the present invention.

The segmentation device according to an embodiment of the present invention comprises an input interface for receiving a generated medical image. The segmentation device also includes a segmentation unit for determining a segmented medical image by processing the generated medical image by a trained AI-based segmentation model. The AI-based segmentation model is provided by the method for AI-assisted generation of annotated medical images including the step of a training of an AI-based uncertainty model and/or an AI-based segmentation model based on the modified received set. The segmentation device also includes an output interface for providing (outputting) the segmented medical image.

The medical analysis system according to an embodiment of the present invention comprises an image generation device for generating a medical image of tissue image data. The medical analysis system according to an embodiment of the present invention also includes an AI-based segmentation device, wherein the AI-based segmentation device comprises an AI-based model, for generating a segmented medical image based on the generated medical image.

Further, the medical analysis system according to an embodiment of the present invention includes the annotation assistance device according to an embodiment of the present invention for generating annotated medical images as training data for training the AI-based segmentation device.

The medical analysis system also includes an analysis device for automatically performing a medical analysis based on the segmented medical image. Preferably, the medical analysis device is arranged to analyse tissue image data. Also preferred, the medical analysis system is arranged to predict an MSI value of a segmented region of a medical image. "MSI" is an acronym for "microsatellite instability" characterizing detected tumors. In that case, the prediction is restricted on the segments classified as cancerous. Advantageously, the analysis can be applied purposefully to relevant regions of medical images, particularly whole slide images. The medical analysis system according to an embodiment of the present invention also shares the other advantages of the method for AI-assisted generation of annotated medical images according to an embodiment of the present invention described above.

Some units or modules of the annotation assistance device or the medical analysis system mentioned above can be completely or partially realized as software modules running on a processor of a respective computing system, e.g. of a control device of a finding system. A realization largely in the form of software modules can have the advantage that applications already installed on an existing computing system can be updated, with relatively little effort, to install and run these units of the present application. An object of embodiments of the present invention is also achieved by a computer program product with a computer program or by a computer program that is directly loadable into the memory of a computing system, and which comprises program units to perform the steps of the inventive method for generation of annotated medical images, at least those steps that could be executed by a computer, especially the steps of training an AI-based uncertainty model and determining classified segments and/or uncertainty regions using the trained AI-based uncertainty model and selecting at least a part of the medical images based on the processing results, or the steps of the computer implemented method, in particular the step of determining a segmented medical image by processing the generated medical image by a trained AI-based segmentation model provided by the method for generation of annotated medical images, when the program is executed by the computing system. In addition to the computer program, such a computer program product can also comprise further parts such as documentation and/or additional components, also hardware components such as a hardware key (dongle etc.) to facilitate access to the software.

A computer readable medium such as a memory stick, a hard-disk or other transportable or permanently-installed carrier can serve to transport and/or to store the executable parts of the computer program product so that these can be read from a processor unit of a computing system. A processor unit can comprise one or more microprocessors or their equivalents.

The dependent claims and the following description each contain particularly advantageous embodiments and developments of the present invention. In particular, the claims of one claim category can also be further developed analogously to the dependent claims of another claim category. In addition, within the scope of the present invention, the various features of different exemplary embodiments and claims can also be combined to form new exemplary embodiments.

Preferably, the coarse annotation is executed based on the following rules:

it is not important that a medical image is completely annotated, however, the annotation should be exact which means that annotations of three labels, i.e. "tumor cells", "no tumor cells" and "healthy tissue", should be "tight" in the following sense:

pixels marked as "tumor cells" should really contain cancer, pixels marked as "no tumor cells" should not be affected by cancer.

An exception may be that non-tissue regions, also named white regions, can be automatically removed.

Preferably, in case the method is used for an iteration, in the first iteration, as much as area as possible should be covered using only few but extended segments, preferably marked by polygons as later described in detail.

In the following iterations as much as area of uncertain regions as possible should be covered.

The annotations should include the same classes in all iteration steps. That means that for example one pixel which is annotated in iteration step 2 as cancerous should also be annotated in iteration step 1 as cancerous or being not yet annotated at al.

Only regions which are annotated are taken for different. The regions defined in later steps can be smaller, however the annotations should remain the same and not alter.

Preferably, the uncertainty model includes a Bayesian model. Such a Bayesian model is based on an artificial Bayesian network. A Bayesian network is a probabilistic graphical model that represents a set of variables and their conditional dependencies via a directed acyclic graph with the variables as vertices or nodes and the dependencies as edges. Each node of the network is assigned to a conditional probability distribution of the random variable which it represents, given the random variables at the parent node. They are described by probability tables. This distribution can be arbitrary, but discrete or normal distributions are often used. Parents of a vertex are those vertices with an edge leading to the vertex. A Bayesian network is used to represent the common probability distribution of all variables involved as compactly as possible using known, conditional independence. The conditional (in)dependency of subsets of the variables is combined with a priori knowledge.

The Bayesian model is trained to generate classified segments as proposals for annotations and uncertainty regions. Uncertainty regions are regions which the model is not be able to segment with enough high reliability. Uncertainty can be determined by extracting feature data at different layers of the Bayesian model and determining a statistical distribution based on these data. Then, uncertainty can be calculated as standard deviation of the mentioned statistical distribution. Details and different variants of approaches for implementing the determination of uncertainty are described later in the description. Training methods based on Bayesian model include a theoretical base such that the limits and meaningfulness of result are at least roughly understood.

A Bayesian model can be trained using not-annotated or pre-annotated medical images as input data and annotated or segmented medical images including classified segments and/or uncertainty regions for evaluation of output data of the Bayesian model during training.

In a preferred variant of the method for AI-assisted generation of annotated medical images according to embodiments of the present invention, the determination und processing includes the determination of classified segments and/or determined uncertainty regions and presenting them to a human expert.

Hence, in the preferred variant, the human expert receives detailed hints and proposals for additional annotations. For example, an automatically placed segmentation can be picked up by the human expert as a graphical mark or a template for an additional annotation which the human expert draws in at the position or spatial course of the segmentation. In other words, the segmentations are proposals of annotations, wherein the segments are generated automatically and the annotations are generated by a human expert. An uncertainty region describes a region of a medical image that can only be segmented with a high uncertainty, for example an uncertainty above a predetermined threshold value.

The knowledge of the local distribution of uncertainty in the medical images can be used to draw the human expert's attention to areas of medical images that he should prioritized annotate, since these annotations are particularly relevant for improving the uncertainty model, preferably the Bayesian model as training data. Advantageously, the human expert gets detailed information about regions to be examined with particular accuracy and attention.

In a preferred variant of the method for AI-assisted generation of annotated medical images according to embodiments of the present invention, the medical images comprise whole slide images. As mentioned-above, whole slide images are used for analysing tissue image data. Preferred, whole slide images are used for detecting tumors in extracted samples of human tissue or tissue from an animal. Advantageously, using the method according to embodiments of the present invention, a highly accurate set of annotated whole slide image data can be effectively generated. These annotated whole slide image data can be used to train a segmentation model for automatically determining tumors in whole slide images. As previously mentioned, these segmented whole slide images can be analysed further for classifying tumor tissue and predicting the course of a cancer illness.

In a preferred variant of the method for AI-assisted generation of annotated medical images according to embodiments of the present invention, the selection of the processed medical images is performed based on a ranking of the processed medical images concerning the uncertainty of determining classified segments i.e. the uncertainty of the uncertainty regions of the medical images. Advantageously, the expert is lead firstly to the most relevant medical images with the highest degree of uncertainty. Hence, the annotation process is accelerated.

In a particular preferred method for AI-assisted generation of annotated medical images according to embodiments of the present invention, at least a part of the received annotated medical images is coarsely annotated. In that particular variant, a set of medical images, preferably, whole slide images, at least partly coarsely annotated by a human expert is received. Then, an annotation process is applied to the received set. "Coarsely annotated" means that only a part of the whole set of medical images are annotated and these medical images may be only partly annotated themselves. Advantageously, a coarse annotation by human expert saves plenty of time for annotation.

In particular, a coarse annotation of a medical image can be a coarse segmentation. A coarse segmentation is a partition of the medical image into regions that correspond to meaningful objects or regions in the medical image. The regions defined by a coarse segmentation are often not fully accurate or detailed, but they provide a rough approximation of the objects or regions in the image that can be used as a starting point for more detailed segmentation or image analysis.

In particular, a coarse annotation or a coarse segmentation can comprise at least one line delineating a region within the medical image. In particular, the coarse annotation or a coarse segmentation can comprise at least one closed curve, which is a one-dimensional geometric shape starting and ending at the same point. In general, the area enclosed by such a closed curve and the closed curve itself can be interpreted as the same object.

In particular, the line or the closed curve can comprise piecewise linear parts or piecewise polynomial parts (also denoted as "splines"). In particular, such a line or closed curve can be automatically constructed based on a finite set of isolated points within the medical image. In particular, those points can be marked by a user generating the coarse annotation or the coarse segmentation.

The annotation process includes following, preferably iterative steps:

First, in the above-mentioned training step, a machine learning process is applied to an AI-based uncertainty model, preferably a Bayesian segmentation model, for training classified segmentation using a subset of coarsely annotated medical images of the received set as training data.

Next, in the above-mentioned classification step, classified segments and uncertainty regions are automatically determined by the trained AI-based uncertainty model in not yet annotated whole slide images of the received set. Classified segments are the automatic correspondence to the annotations. While annotations are drawn in or at least checked by a human expert, classified segments can be generated automatically. Also the classified segments are realized by marking regions of a medical image. For example, a graphical mark can be realized by a closed line surrounding the classified segment and the colour of the closed line classifies the segment. In case a human experts checks the classified segments, the classified segments become annotations.

Further, in the above-mentioned selection step, at least a subset of the processed medical images including the determined uncertainty regions as regions to be annotated next by the human expert are displayed to the human expert. For example, the human expert uses an annotation tool which includes a display for displaying medical images to be annotated and for displaying annotations sketched in the medical images.

Furthermore, additional annotations are created by the human expert in the subset of the processed medical images. That means, that the human expert remarks the displayed uncertainty regions and works on these specific areas based on his expertise. After that, in the above-mentioned reception step, the modified subset is received from the expert und used as training data for training the AI-based uncertainty model and the aforementioned iterative steps are repeated, until a predetermined quality criteria for the annotated medical images is achieved.

The quality of the annotations of the whole slide images can be measured by comparison of the annotations with labels of the medical images. In case the medical images are not labelled, a comparison between annotated medical images of different iteration steps can be implemented. In case the difference between annotated medical images of different iterations steps is smaller than a predetermined threshold, the quality criteria is fulfilled.

Advantageously, the presented variant of the method according to embodiments of the present invention enables to avoid complete pixel-exact annotation of all medical images for generating completely annotated medical images and enables to use graphical representations of uncertainty regions, preferably uncertainty masks, in order to maximize the utility of any further annotation. Hence, the human expert is guided in each iteration step of the annotation to annotate the most effective additional medical images and regions on these medical images. The advantageous approach leads to massive saving of time and cost when annotating medical images compared to the traditional approach of annotating all data by a human expert without any support by an assistance device. The method is also appropriate for automatically sampling hard and informative examples. In this way, a strong dataset is provided for a training of a segmentation model. As already mentioned above, it has been shown that training with selected hard examples of training data is much more effective than training with a large amount of data, wherein most of the data correspond to easy cases. Further, the method according to an embodiment of the present invention ensures high quality and noise-free and correct annotation at any step. Furthermore, providing coarse high-level annotation by a human expert is even faster than utilizing detailed but inexact annotation.

As mentioned above, preferably, the process steps ii) and iii) are iteratively repeated using the modified received set as training data.

In other words, the automatically performed steps are iteratively performed based on the respective modified received sets as received sets.

In case the process steps are iteratively repeated using the modified received set as training data, the quality of annotated medical image data can advantageously be improved stepwise, until a predetermined quality criteria for the annotation is achieved.

Also preferred, in the step of determining segments and uncertainty regions of the method according to embodiments of the present invention, the additional medical images are still not annotated by the human expert. Hence, time and effort can be saved by merely annotating a part of the set of medical images underlying the following guided annotation process.

Preferably, for the learning step, i.e., the training step of the method for AI-assisted generation of annotated medical images according to embodiments of the present invention also tissue image data of healthy tissue is used. Hence, the AI-based uncertainty segmentation model also learns to segment healthy tissue regions of a medical image correctly.

In a variant of the method according to embodiments of the present invention, the step of selecting the classified segments and/or uncertainty regions includes the steps of generating a simplified graphical representation of the uncertainty regions and extracting the simplified graphical representation for presentation to the human expert. "Simplified graphical representation" means that the data amount of the representation is significantly reduced compared to the pixel data of the assigned image region. The reduction of data amount can be achieved by a generation (as the "Simplified graphical representation") of a graphical representation, which comprises a relatively less complex structure than a complex structure of the represented classified segment and/or uncertainty region, including pixel data. For example, the complex structure may comprise high resolved pixel data of a medical image. The relatively less complex structure may then comprise pixel data with low resolution (lower than the high resolved pixel data), preferably such that the outlines or boundary lines of the classified segment and/or uncertainty region are graphically represented and made visible.

Advantageously, the graphical representation can be processed with much less effort compared to the original pixel data.

Preferably, the simplified graphical representation includes at least one of:

a point set based representation,
a parameter based representation.

The point set based representation includes a pixel based representation, however preferably a simplified pixel based representation, for example a mask. Advantageously, a reduced amount of pixel simplifies calculations processes in the method according to embodiments of the present invention. A parameter based is restricted to a limited number of parameters. Such a representation includes, for example, one of a space curve, a polygon line, a spline, a boundary line and an edge line.

In case the simplified graphical representation includes a mask, the uncertainty regions are determined by generating uncertainty masks covering the determined uncertainty regions. The use of masks can be combined with the use of a parameter based representation, for example a polygon which is determined for confining the classified segments and uncertainty masks. Then, the parameter based representations, for example polygons, are extracted and transferred into an annotation tool for displaying the extracted information to a human expert. Uncertainty masks comprise surfaces covering uncertainty regions. The polygons are parameterized polygonal lines surrounding the uncertainty masks. Advantageously, simplified graphical representations and in particular the parameter based representations, for example polygons, merely take up only a fraction of the data capacity needed for pixel based image data. Hence, the simplified graphical representations can be processed with less computation than image data. The same technique can be applied to the other segments generated by the AI-based uncertainty model.

In a further variant of the method according to embodiments of the present invention, the determination of parameter based representations, for example polygons, is implemented using thresholding and edge detection algorithms. Since tumor tissue has a different grey value or colour compared to healthy tissue and the masks used for covering the determined segments and uncertainty regions have edges, thresholding and edge detection is an appropriate approach for defining parameter based representations like polygons around the detected segments and regions.

In a preferred variant of the method for AI-assisted generation of annotated medical images according to embodiments of the present invention, a ranking for selecting the processed medical images, preferably the classified segments and/or determined uncertainty regions of preferred processed medical images, is based on the type of the classified segments and/or determined uncertainty regions. That means that the order in which the medical images to be annotated next are presented to the human expert is determined based on the learning effect of particular types of classified segments and/or determined uncertainty regions. Advantageously, the more or even most effective medical images and regions can be presented first to the human expert or the presentation is restricted to these more or even most effective medical images and/or regions and hence the additional annotations of the human expert are particular efficient for training the AI-based uncertainty model.

Such a type of classified segments and/or determined uncertainty regions preferred by the ranking comprises preferably at least one of:

an image structure systematically neglected by a coarse annotation,
a high uncertainty,
assigned metadata revealing a type of rarely collected medical images,
image features revealing dissimilar medical images.

Preferably, an image structure neglected by the coarse annotation comprises a tumor frontier area. Focusing on these difficult regions to annotate enables to increase the effectivity of the training of the AI-based uncertainty model and the effectivity of the annotation by the human expert.

Similarly, also regions of high uncertainty are particular effective as training data for the AI-based uncertainty model and also need a particular focus of the human expert for correct annotation. Advantageously, areas with high uncertainty yield the maximum information gain and also the model is enabled to categorize difficult tissue.

Assigned metadata may reveal a type of rarely collected medical images. Metadata include data that provide information about other data, but not the content of the data. For example, image data of young persons including tumor structures may be very rare and therefore there is a risk that this type of image data will be neglected in the training of the AI-based uncertainty model. In that example, metadata give the information of the age of the patient related to the image data.

Unlike medical images are also very preferred for training an AI-based uncertainty model, since these unlike medical images reduce the epistemic uncertainty and such the training effect is increased and the expense of the human expert is reduced.

Preferably, the AI-based uncertainty model, preferably a Bayesian uncertainty model, comprises at least one of:

a specialized spatial segmentation loss algorithm,
a feature pyramid pooling algorithm,
a Monte Carlo Dropout algorithm,
a Monte Carlo Depth algorithm,
a Deep Ensemble algorithm.

The AI-based uncertainty model, in particular a Bayesian model, processes pre-annotated medical images as input data and generates medical images including classified segments and/or uncertainty regions as output data. The mentioned input and output data, appropriately prepared as labelled data, can be also used as training data for training the AI-based uncertainty model, in particular the Bayesian model, whereby the medical images including classified segments and/or uncertainty regions can be used for evaluation of output data of the Bayesian model during training.

In case the learning process comprises a specialized spatial segmentation loss algorithm, the AI-based uncertainty model is adapted to generate segmentations corresponding to the shape and extension of the annotations drawn in by the human expert. The specialized spatial segmentation loss algorithm is performed with pre-annotated medical images as input data and medical images including classified segments as output data. The mentioned input and output data, appropriately prepared as labelled data can be also used as training data for training the specialized spatial segmentation loss algorithm, whereby the medical images including classified segments can be used for evaluation of output data of the spatial segmentation loss algorithm during training.

The algorithm of feature pyramid pooling enables to learn the coarse annotation well and to generalize to unannotated regions in an annotated medical image. The method of pyramid pooling is described in Hanchao Li, Pengfei Xiong, Jie An, and Lingxue Wang, "Pyramid attention network for semantic segmentation", arXiv preprint arXiv:1805.10180. Feature pyramid pooling is used to perform spatial pyramid attention structure on high level output and combining global pooling to learn a better feature representation and a global attention upsample module on each decoder layer to provide global context as a guidance of low-level features to select category localization details. The feature pyramid pooling algorithm is used with feature maps as input data and output data. The mentioned input and output data, appropriately prepared as labelled data can be also used as training data for training the feature pyramid pooling algorithm.

The Monte-Carlo dropout and/or Monte Carlo Depth algorithm and/or Deep Ensemble learning approach is used for determining uncertainty regions. A Monte-Carlo dropout method includes an extraction of feature data in different layers of an artificial neural network. The extracted feature data are used to determine a statistical distribution of the features also called sample variance. Based on the statistical distribution, an uncertainty can be calculated as standard deviation.

The Monte Carlo Dropout algorithm receives feature maps of different stages of the uncertainty model as input data and generates feature maps as output data. The mentioned input and output data, appropriately prepared as labelled data can be also used as training data for training the Monte Carlo Dropout algorithm.

The Monte Carlo Depth algorithm also receives feature maps of images as input data and output data. The mentioned input and output data, appropriately prepared as labelled data, can be also used as training data for training the Monte Carlo Depth algorithm.

Deep Ensemble works with a plurality, for example 15, baselearners. These base-learners include parallel working AI-based models, preferably artificial neuronal networks. Then Bayesian inference is carried out on these base-learners. Based on the statistics of different results of different base-learners, sample variance is used as an uncertainty metric. The Deep Ensemble algorithm is performed using a set of input data including different subsets of image data or feature maps for feeding the so called base-learners. Further, also the output data include different subsets of image data or feature maps, or alternatively a map indicating sample variance of the input data. The mentioned input and output data, appropriately prepared as labelled data can also be used as training data for training the Deep Ensemble algorithm.

In a variant of the method according to embodiments of the present invention, the determination of classified segments comprises a refinement of a segmentation of the medical images coarsely annotated by the human expert.

A refinement means that the boundary lines of a segmented and classified region are adjusted more closely to the actual edges of the region. Advantageously, time can be saved, since the human expert merely needs to mark the different tissue classes coarsely. Nevertheless, the annotated segments become precise during the training process such that a high quality data set of annotated medical images is generated in the course of the training.

In a variant of the method for AI-assisted generation of annotated medical images according to embodiments of the present invention, the annotated medical images fulfilling the predetermined quality criteria are used as training data for training an AI-based segmentation model for segmentation of medical images. Advantageously, a set of training data with high quality is provided with relatively low time effort for training AI-based segmentation models.

Such a trained AI-based segmentation model may be applied for segmentation of medical images of tissue image data of a patient.

In a variant and tangible application of the medical analysis system according to embodiments of the present invention, the analysis device comprises a tile selection device for selecting tiles of a segmented whole slide image and an MSI prediction device for predicting an MSI-value based on an AI-based separate analysis of the individual selected tiles of a segmented whole slide image.

The term "microsatellite instability" abbreviated by MSI, MSI-H or MSI-high describes deviations in the number of short, repetitive genetic material—the microsatellites. Such deviations are caused by a defect in the DNA repair mechanism: In those affected cells the mismatch repair system MMRD, which is responsible in particular for correcting small errors in the base sequence, is disrupted.

Such errors can occur in replication when the DNA doubles in preparation for cell division. If the mismatch repair is disturbed, small mutations accumulate in the cells in the course of cell division. Inherited disorders in the mismatch repair system are the basis for hereditary non-polyposal colon cancer (Lynch syndrome). But they can also occur in sporadic tumors.

MSI/MMRD is currently a biomarker with a broad spectrum of indications in tumor pathology, especially in colorectal, endometrial and gastric cancer. In advanced carcinomas, MSI is an established parameter for predicting the therapy response of checkpoint-directed immunotherapies.

Advantageously, through using the medical analysis system including an MSI prediction device, a detected tumor can be classified and a therapy of tumor can be adapted to the determined MSI-value.

BRIEF DESCRIPTION OF THE DRAWINGS

Embodiments of the present invention are explained below with reference to the figures enclosed once again. The same components are provided with identical reference numbers in the various figures.

The figures are usually not to scale.

FIG. 2 shows a flow chart diagram illustrating the method for AI-assisted generation of annotated medical images according to an embodiment of the present invention, FIG. 3 shows a whole slide image with annotations provided by a pathologist.

DETAILED DESCRIPTION

Figure 1:
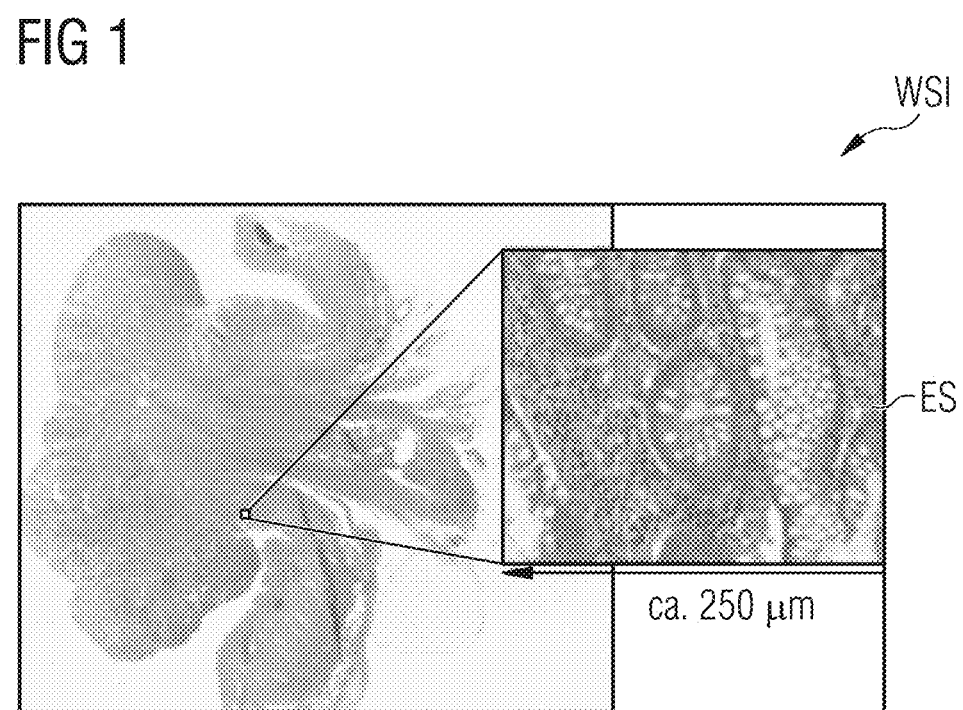
FIG. 1 shows an exemplary illustration of a whole slide image.

In FIG. 1, an exemplary whole slide image WSI is illustrated. The whole slide image WSI illustrates a cross section of the colon of a patient. Whole slide images WSI are microscopically magnified images yielding an input size of hundreds of thousands of pixels in each dimension, which makes whole slide images WSI particularly suitable for data hungry AI algorithms. On the right side of FIG. 1, an enlarged section ES of the whole slide image WSI is depicted. Hence, a pathologist can zoom in the whole slide image WSI for examining the microstructure of the shown colon tissue.

FIG. 2 shows a flow chart diagram 200 illustrating the method for AI-assisted generation of annotated medical images according to an embodiment of the present invention.

In step 2.I, a human expert creates coarse initial annotations CIA on a subset S1 of a presented data set S of medical images WSI, in particular a set S of whole slide images, for generating training data. For example, the annotation is carried out on the subset S1 of 300 whole slide images WSI, which is a subset of the complete set S of 1000 whole slide images WSI of different patients annotated by the method, according to an embodiment of the present invention, and used for a training of an AI-based uncertainty model BSM, in particular a Bayesian neural network based segmentation model BSM. Hence, there are a majority of unannotated whole slide images WSI to be annotated later based on computed uncertainties. The human expert views whole slide images WSI at a very high level and draws large polygons around regions containing the relevant segmentation class. Such a segmentation class can comprise the class "tumor" and the class "healthy tissue" or the class "unknown state" or "no tumor cells". The annotation is not completely performed, which means that not every relevant region in a whole slide image WSI needs to be annotated by the human expert. In addition, an annotation does not need to be exact in areas where background is shown.

Figure 3:
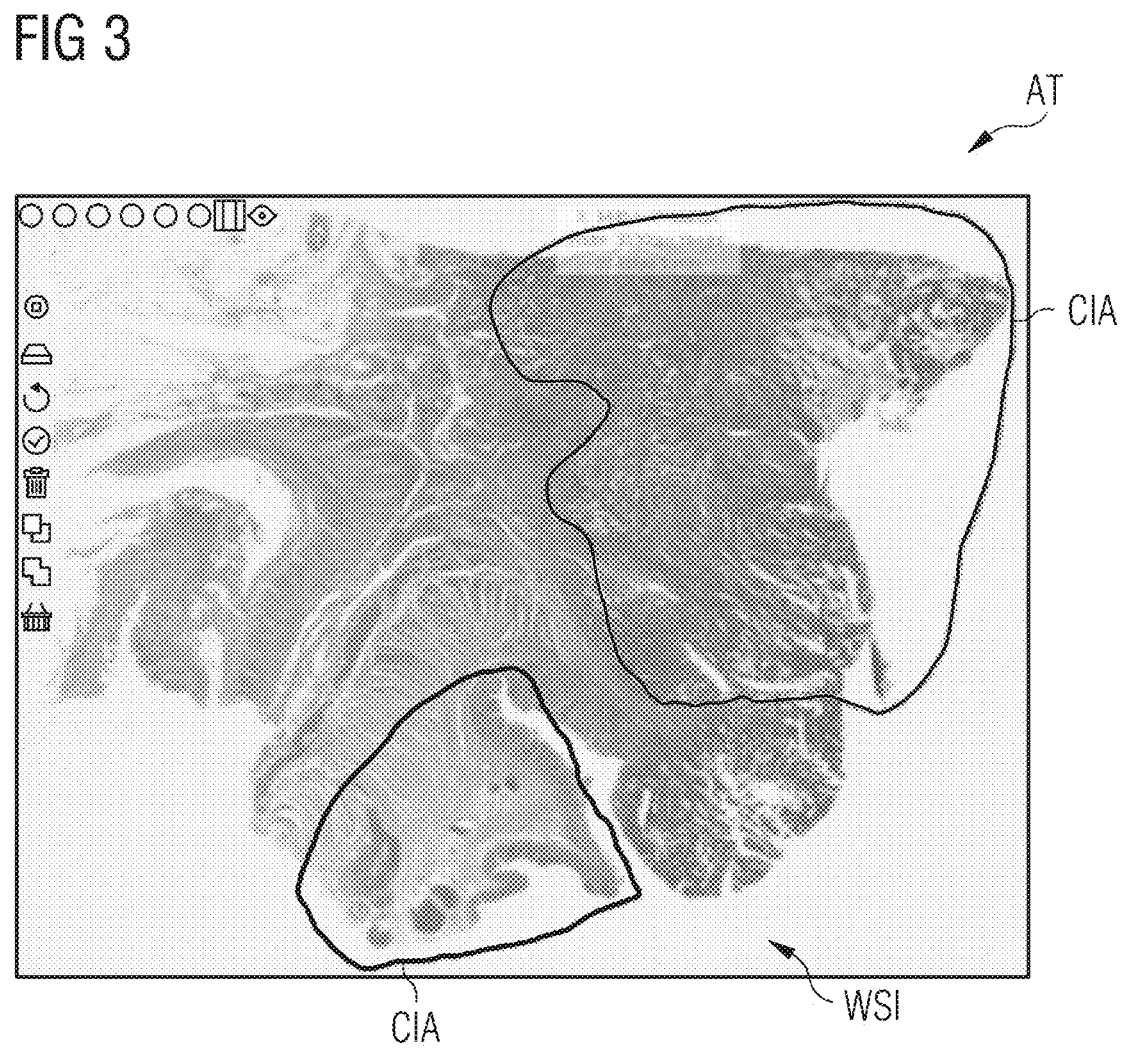

As you can see in FIG. 3, the polygons of the annotated segments partly exceed the background area. In a step of refinement, background can be automatically identified at a later stage and the polygons can be then corrected corresponding to the identification. Those coarse initial annotations CIA can be collected very quickly by well trained human experts, for example in less than 10 seconds per whole slide image WSI.

Figure 4:
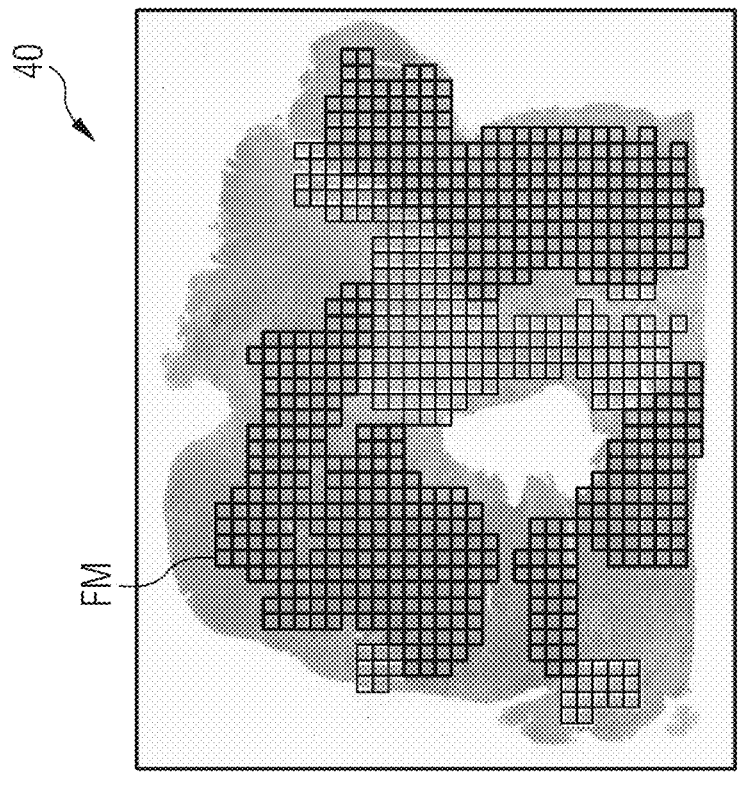
FIG. 4 shows a schematic illustration of a feature pyramid pooling method used as the learning process for segmentation in the method for AI-assisted generation of annotated medical images according to an embodiment of the present invention.
Figure 4:
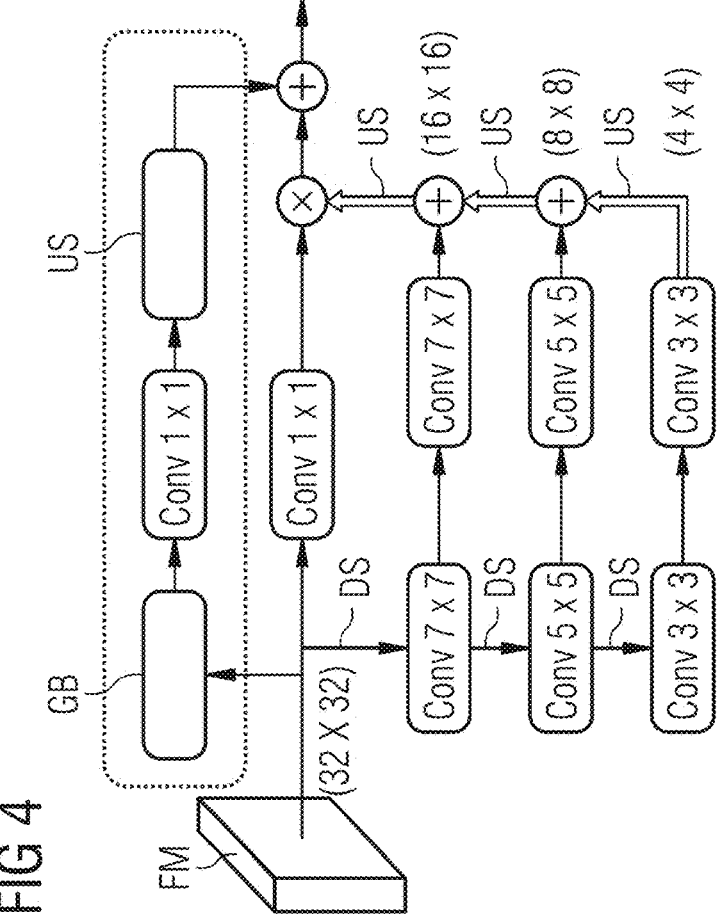

In step 2.II, an AI based learning process is performed based on the coarse initial annotations CIA as labelled training data for training a Bayesian neural network based segmentation model BSM, also named segmentation model. The learning process includes a training for an automated segmentation and a training for determining uncertainty regions UR. The uncertainty regions are assigned with a high uncertainty by the trained automated segmentation model. The learning process for segmentation includes a specialized segmentation loss and feature pyramid pooling, which allows the segmentation model to learn the coarse annotation well and also generalize to unannotated regions in the annotated whole slide images WSI. The segmentation model BSM is able to produce very distinct cohesive segmentation regions. The principles of feature pyramid pooling are illustrated in FIG. 4. A Bayesian segmentation with a Monte Carlo Dropout method as mentioned-above is visualized in FIG. 5.

In step 2.III, the trained segmentation model BSM is applied to the set S of partly annotated and partly not annotated 1000 whole slide images WSI and a plurality of classified segments SG, are predicted by the trained segmentation model BSM. Segmentation masks SGM corresponding to the classified segment SG are illustrated in FIG.

Figure 5:
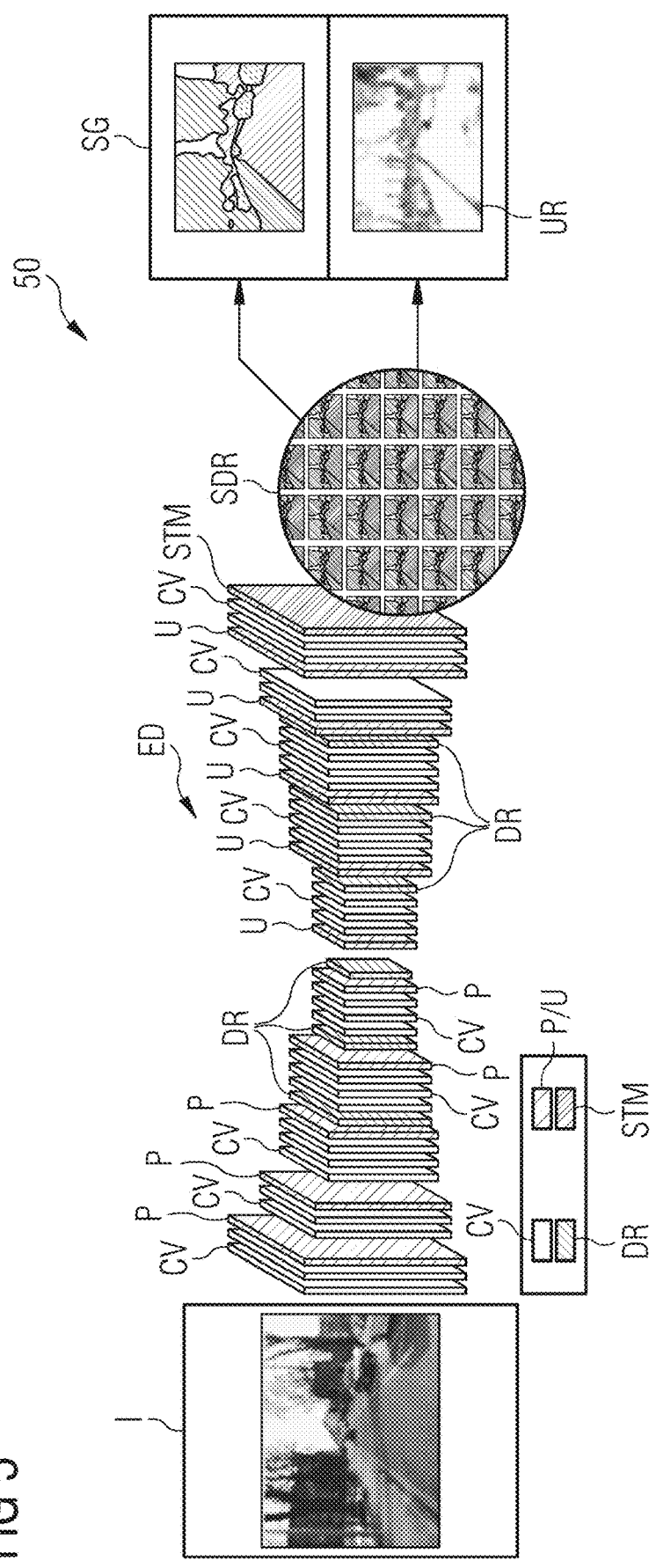
FIG. 5 shows a schematic view on a Bayesian segmentation using Monte Carlo Dropout or Deep Ensemble for determining an uncertainty model assigned to a segmentation of a medical image.
Figures 6, 7:
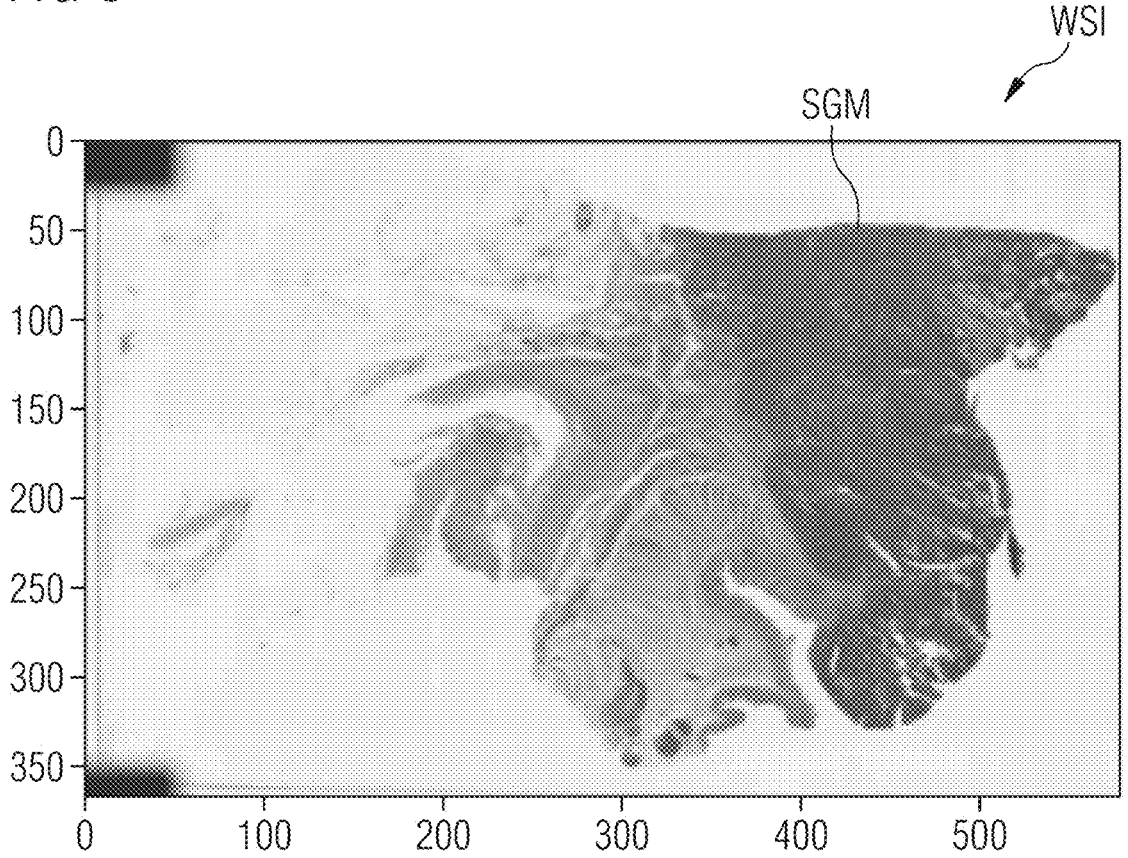
FIG. 6 shows a raw output of the trained AI-based uncertainty model illustrated as an overlay over a whole slide image.
FIG. 7 shows a raw output of uncertainty data.

6. Also healthy whole slide images WSI are used to train the segmentation model BSM Further, also uncertainty regions UR are predicted using a Monte-Carlo Dropout or Deep Ensemble Learning approach as illustrated in FIG. 5. Uncertainty masks UM corresponding to the predicted uncertainty regions UR are illustrated in FIG. 7. The uncertainty masks UM are the dark regions in FIG. 7.

Figure 8:
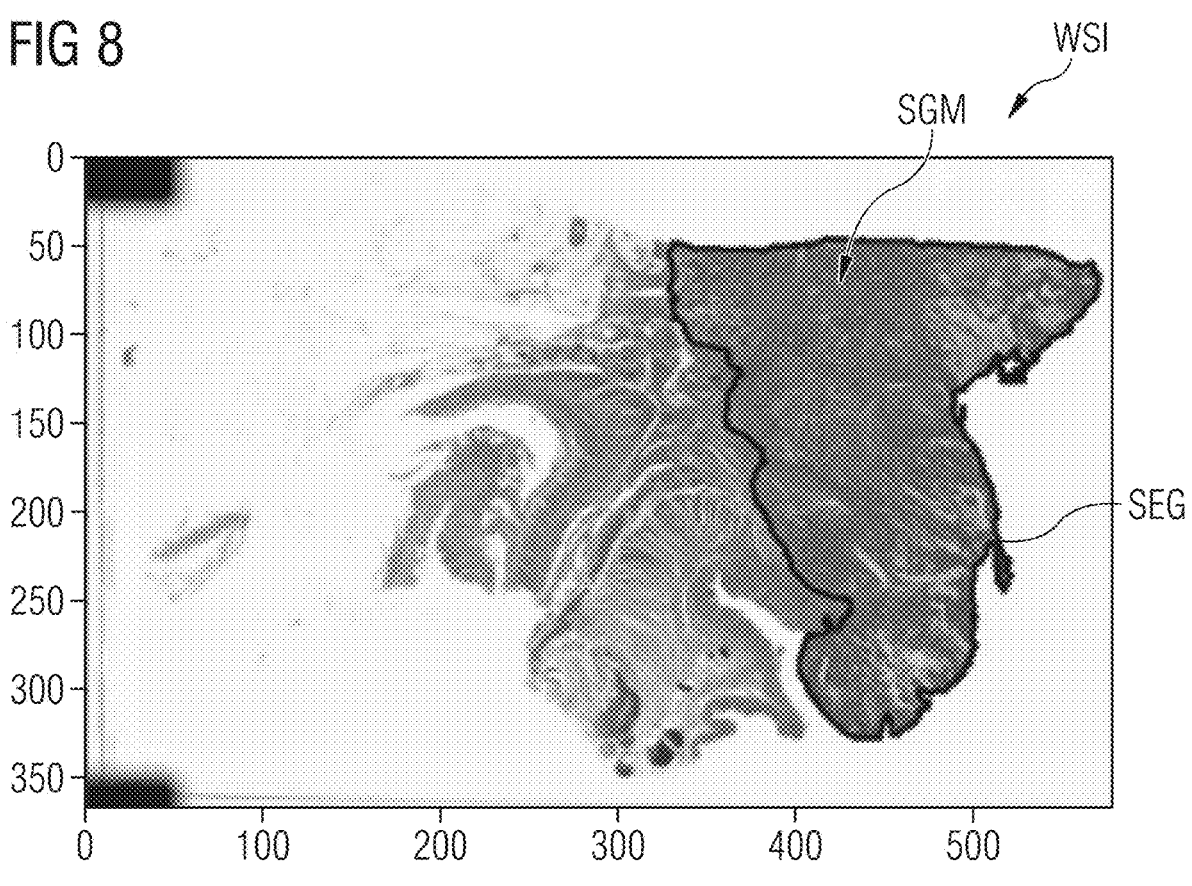
FIG. 8 shows a processed output of segments using contour algorithms.

In step 2.IV, a contour detection approach is applied to translate the predicted segments SG into segmentation masks SGM and into segmentation polygons SEG and the uncertainty regions UR into uncertainty masks UM and into uncertainty polygons UP. The segmentation polygons SEG are converted using contour algorithms for indicating a classified area, for example a tumor area. Those segmentation polygons SEG can be integrated into an annotation tool AT. The segmentation polygons SEG assigned to the segmentation masks SGM are illustrated in FIG. 8.

Figure 9:
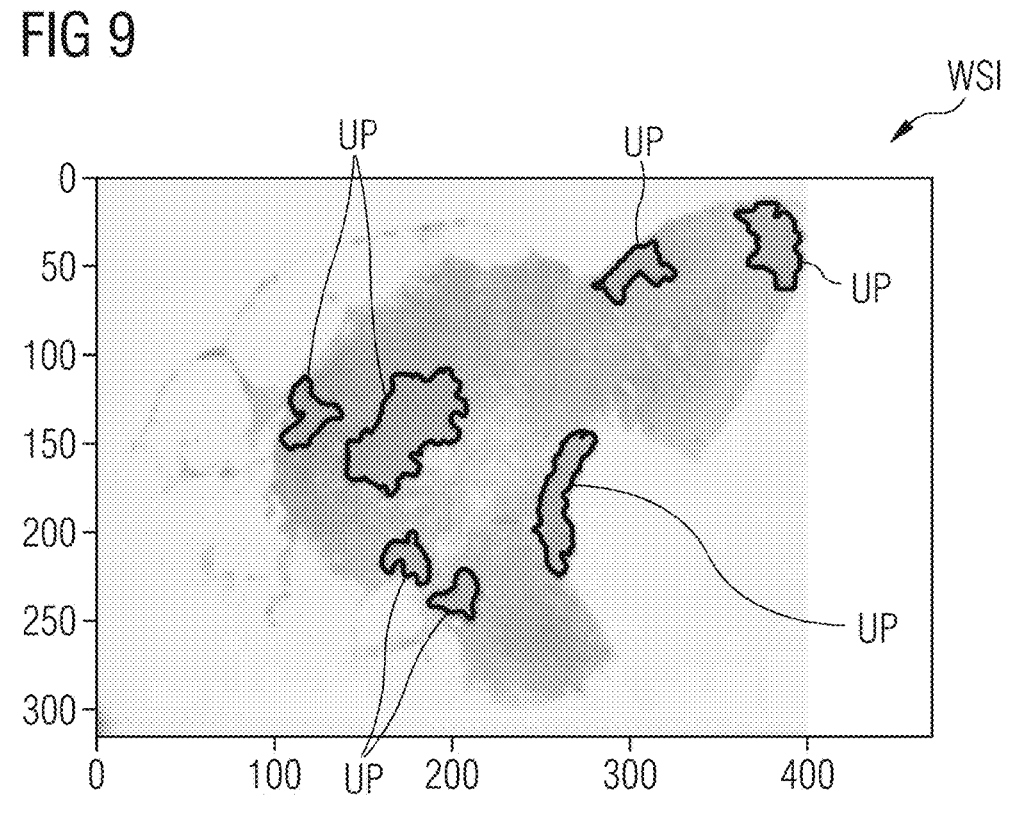
FIG. 9 shows an illustration of processed and filtered uncertainty data.
Figure 10:
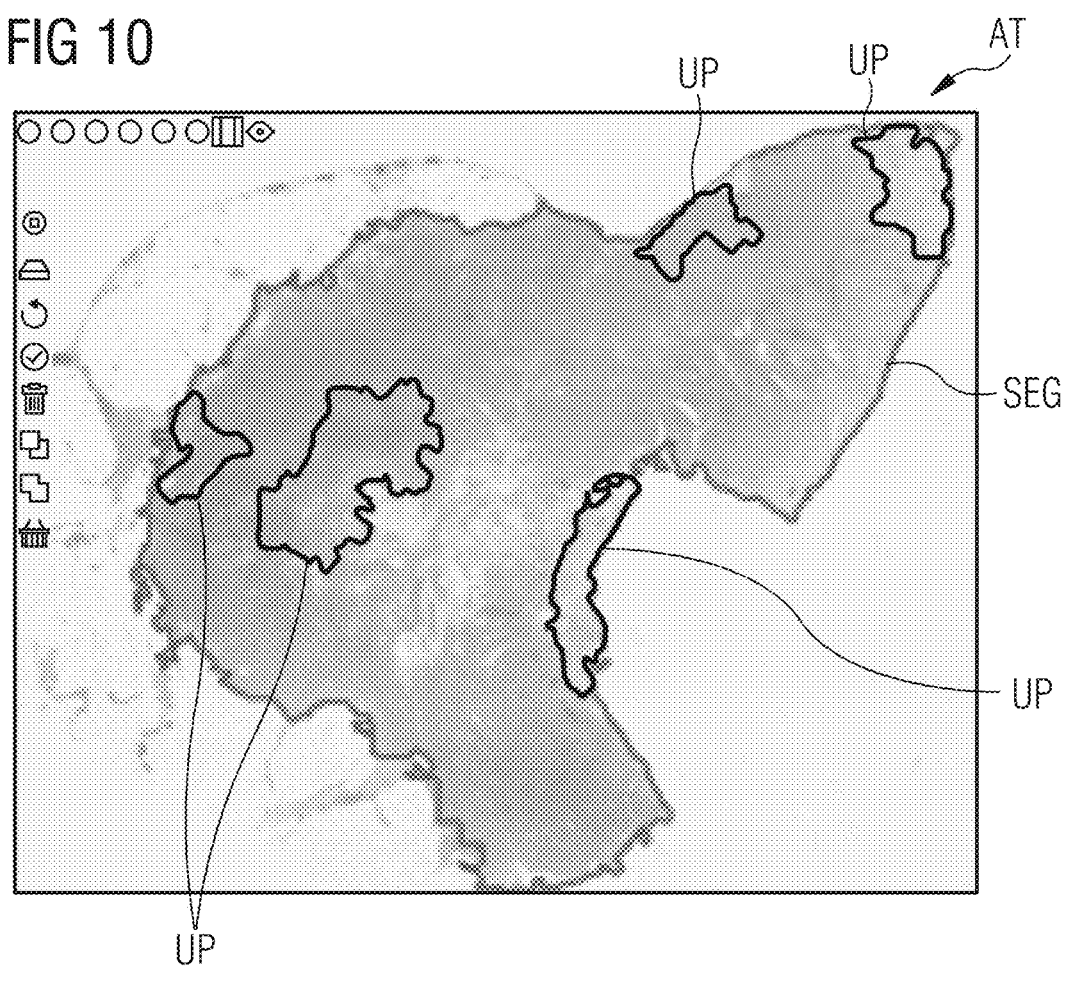
FIG. 10 shows integrated uncertainty data and tumor predictions in an annotation tool.

The uncertainty masks UM are processed using morphology based and contour detection based algorithms towards the goal of computing large and meaningful uncertainty polygons UP based on the uncertainty masks UM. The uncertainty polygons UP are illustrated in FIG. 9. Further, the uncertainty polygons UP are extracted and integrated into an annotation tool AT. The annotation tool AT is used by the human expert to segment the whole slide images WSI by hand. The result is shown in FIG. 10. Annotation areas with high uncertainty yield the maximum information gain and also help to model for categorizing difficult tissue. Utilizing the uncertainty information also eliminates the issue that certain regions, for example cancer invasive fronts, are systematically ignored or under-sampled if the whole slide images WSI are not completely annotated.

In step 2.V, a ranking algorithm is used to select a set S2 of not yet annotated whole slide images WSI of coarsely annotated whole slide images WSI, for example 100 whole slide images, for annotation by the human expert. These whole slide images WSI are selected based on the uncertainty maps, clinical meta data and image features towards the goal of selecting a set of whole slide images with a high variability and large uncertainty regions UR. Using the large uncertainty regions UR, a batch of whole slide images WSI which includes these large uncertainty regions UR to be annotated next is detected. The corresponding uncertainty polygons UP in the selected whole slide images WSI are then made visible for the human expert.

In step 2.VI, it is determined if the generated annotations in later iterations rounds also based on automatically determined segments achieve a predetermined annotation quality SQ. The determination can be achieved by comparing the generated annotations with label information of the corresponding training data.

The quality is assigned to the trained AI-based uncertainty model. Based on a test set, also named held-out set, one knows exactly what the model is supposed to predict.

If the previous annotations are good, sufficiently complete and diverse, then the trained model on the test set should deliver good predictions. It can be assumed that other models that are trained on the training data will at least achieve the performance of the model used for generating the training data, i.e. the baseline model. Otherwise they can be replaced by the baseline model.

In case the predetermined annotation quality SQ has not yet been achieved, which is symbolized with "n" in FIG. 2, the method goes further with step 2.VII, wherein the uncertainty polygons UP corresponding to uncertainty regions UR are visible to the human expert and the expert is asked to ensure that those areas are covered by the annotation. In this step, the expert draws in the whole slide images WSI additional annotations AA, in particular in the areas of the uncertainty polygons UP. Then the method continues with step 2.II based on the additionally annotated whole slide images WSI and so on, until the predetermined annotation quality SQ has been reached, which is symbolized in FIG. 2 with "y".

In the end, in step 2.VIII, a completely annotated set S' of whole slide images WSI is put out.

FIG. 3 shows an annotation tool AT with icons at the upper left corner and a whole slide image with annotations CIA provided by a pathologist is illustrated. The line on the left side represents an area including healthy tissue and the line on the right side represents a tumor area. The pathologist, i.e. the human expert, is not asked to annotate the entire whole slide image WSI, but rather to identify large cohesive areas. This can be done very quickly.

FIG. 4 shows a schematic illustration 40 of a feature pyramid pooling method. On the left side of the illustration, a feature map FM, which is generated based on image whole slide image data, including a 32×32 feature raster, is depicted. One single feature map FM is assigned to one single square in the grid on the right side of FIG. 4.

The data of the feature map FM are then used for a so-called global pooling branch marked by a dotted line and including a global pyramid pooling step GB, a 1×1 convolution and an upsampling step US. A central branch includes one single direct 1×1 convolution and a third branch (the lower branch in FIG. 4) comprises a pyramid pooling branch. The pyramid pooling branch includes three sub-branches, wherein each includes one, two or three downsampling steps DS, two convolution steps and corresponding to the respective downsampling steps DS, one, two or three upsampling steps US. A first sub-branch includes two sequential 7×7 convolutions, a second sub-branch includes one 7×7 convolution and two sequential 5×5 convolutions and a third sub-branch includes one 7×7 convolution, one 5×5 convolutions and two sequential 3×3 convolutions. Due to the different numbers of downsampling step DS, the result of the different sub-branches reveals different resolutions, i.e. the lower sub-branch generates a resolution of 4×4 features, the sub-branch in the middle generates a resolution of 8×8 features and the upper sub-branch generates a resolution of 16×16 features. The results of the three sub-branches are added and convoluted with the result of the central branch. Such, feature maps FM including different resolutions are mixed. The result of that convolution is added to the result of the global pooling branch.

FIG. 5 shows a schematic illustration 50 of a Bayesian segmentation with Monte Carlo Dropout or Deep Ensemble. On the left side of FIG. 5, an input RGB image I is symbolized which is input to a convolutional encoder-decoder ED. The convolutional encoder-decoder ED comprises a plurality of convolutional layers, batch normalisation layers and rectified linear activation function layers which are marked with the reference sign CV and by a white surface. These layers form different stages, also named convolutional block, with different resolutions of features. Different resolutions are symbolized by different sizes of the layers. A new stage with a lower (on the left side of the convolutional encoder-decoder ED) is generated using a pooling layer P (on the left side) and a new stage with a higher resolution (on the right side of the convolutional encoder-decoder ED) is generated using an upsampling layer U (on the right side).

The pooling layers P and the upsampling layers U are made known by a hatching from the left upper side to the right lower side.

Further, some dropout layers DR are each inserted between a pooling layer P and following convolutional layers CV or between a pooling layer P and an upsampling layer U or between a convolutional layer CV and an upsampling layer U. The dropout layers DR add dropout after each convolutional block. These dropouts are used to determine a sample variance as an uncertainty metric. Further, in the end, a normalisation is executed by a so called Softmax-layer STM. Then, a stochastic dropout SDR is performed to get stochastic dropout samples. A mean value of the stochastic dropout samples is used for determining a segment SG and a variance of the stochastic dropout samples is used for determining an uncertainty model including uncertainty regions UR, i.e. the dark regions in the lower image on the right side of FIG. 5.

FIG. 6 shows a raw output of the trained model as an overlay, i.e. a segmentation mask SGM, over a whole slide image WSI. The trained Bayesian segmentation model is able to predict cohesive areas containing a tumor. The model is able to generalize well beyond the annotated areas.

FIG. 7 shows a raw output of uncertainty masks UM in a whole slide image WSI, detected using a Bayesian model.

FIG. 8 shows a processed output of segments SEG and polygons, i.e. segmentation polygons SEG generated using contour algorithms. The contour algorithms are able to convert a segmentation map into a polygon indicating a tumor area.

FIG. 9 shows an illustration of processed and filtered uncertainties of a whole slide image WSI represented as uncertainty polygons UP. Uncertainties at boundary regions are removed and uncertainty polygons UR covering large areas of uncertainties i.e. large uncertainty regions are computed. Those uncertainty polygons UP can be integrated into the annotation tool AT and presented to the human expert for increasing the information content of the training data set.

FIG. 10 shows integrated polygons UP of uncertainties and integrated segmentation polygons SEG of tumor prediction segments in an annotation tool AT. These polygons UP, SEG are required to be edited by the human expert.

Figure 11:
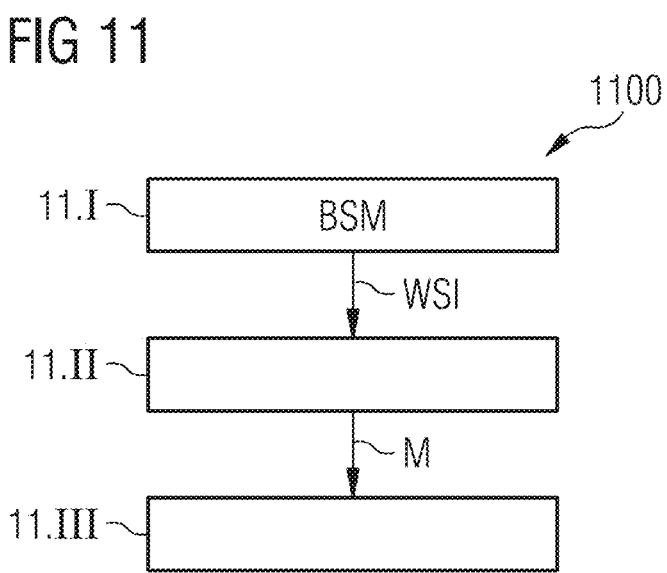
FIG. 11 shows a flowchart diagram illustrating an automatic segmentation method using the method for AI-assisted generation of annotated medical image data according to an embodiment of the present invention.

FIG. 11 shows a flow chart diagram 1100 illustrating the use of the method for AI-assisted generation of annotated medical images WSI according to an embodiment of the present invention for an automatic segmentation. In step 11.I, annotated whole slide images WSI are generated by the method for AI-assisted generation of annotated medical images according to an embodiment of the present invention. In step 11.II, the annotated medical images WSI generated in step 11.I are used for training an AI-based model M. In step 11.III, the trained AI-based model M is applied to a new whole slide image to be segmented. The trained AI-based model may be different from the uncertainty model BSM used for generation of the annotated medical images WSI.

Figure 12:
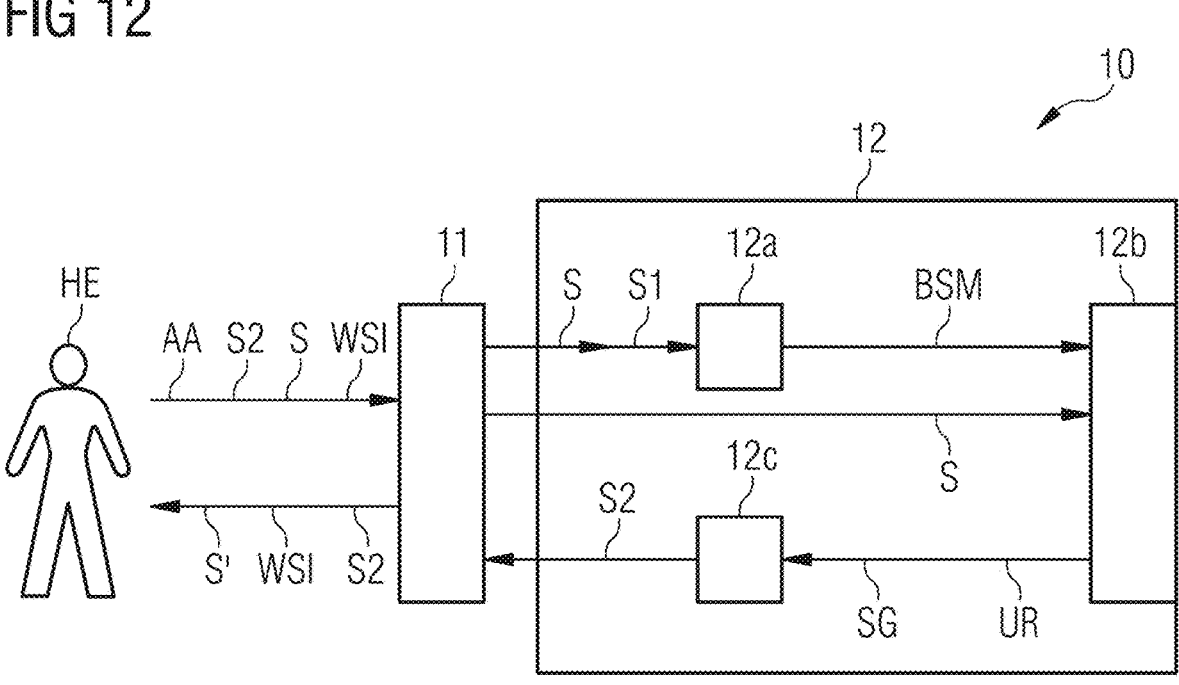
FIG. 12 shows a schematic view on an annotation assistance device according to an embodiment of the present invention.

In FIG. 12, a schematic view on an annotation assistance device 10 according to an embodiment of the present invention is shown. The annotation assistance device 10 comprises a communication interface 11, which is positioned in FIG. 10 at the left side. The communication interface 11 is set up for receiving a set S of whole slide images WSI, coarsely annotated by a human expert HE. The annotation assistance device 10 also includes an application device 12 for applying an iterative annotation process on the received set S. The application device 12 includes as functional components a model training unit 12a for applying a machine learning process to a Bayesian neural network based segmentation model BSM for training classified segmentation using a subset S1 of coarsely annotated whole slide images of the received set S as training data. Part of the application device 12 is also a process unit 12b for automatically processing the received set S by determining classified segments SG and uncertainty regions UR by the trained segmentation model BSM in not yet annotated whole slide images WSI or coarsely annotated whole slide images WSI of the received set S.

The annotation assistance device 10 also comprises a selection unit 12c for selecting a set S2 of not yet annotated whole slide images as a subset of the received set S based on the results of the determination step.

The communication interface 11 displays the set S2 of not yet annotated whole slide images WSI including the determined uncertainty regions UR as regions to be annotated next by the human expert and receives additional annotations AA created by the human expert HE in the now processed set S2 of whole slide images WSI.

The application device 12 repeats the iterative steps using the processed set S2 of whole slide images WSI, additionally annotated by the human expert HE, as training data, until a predetermined quality criteria for the annotated whole slide images WSI is achieved.

At last, the completely annotated set S' of whole slide images WSI is output. The set S' of annotated whole slide images WSI can be used in an MSI prediction system for predicting an MSI parameter value based on a whole slide image WSI of a patient. MSI is an acronym for microsatellite instability.

Figure 13:
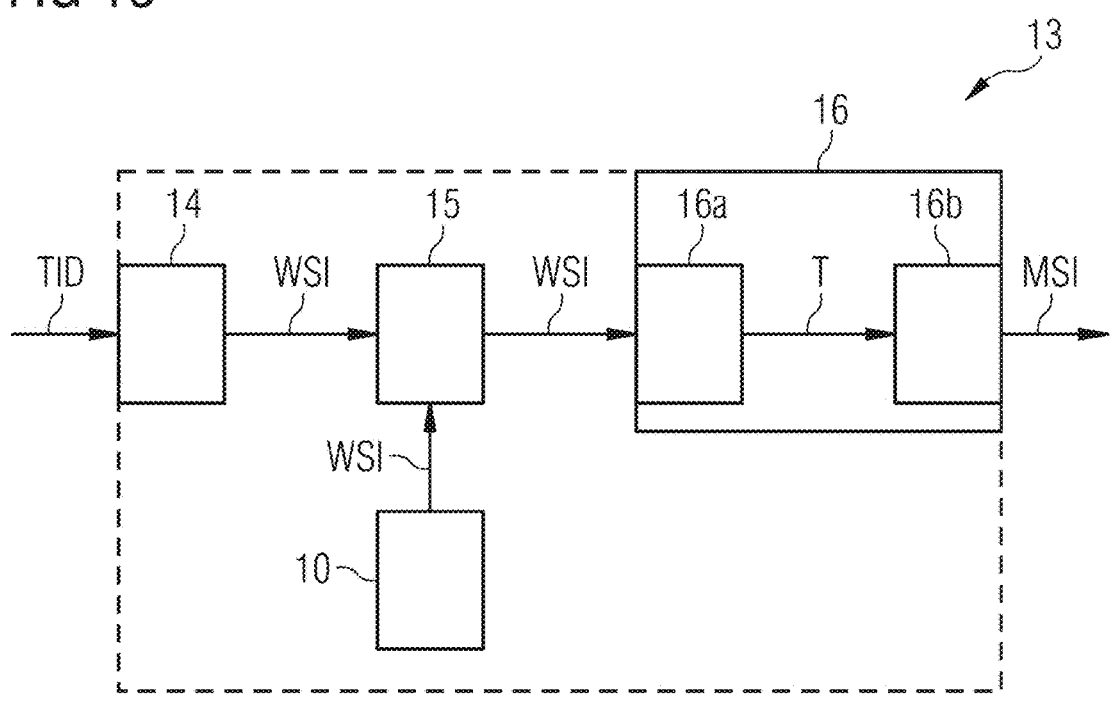
FIG. 13 shows a medical analysis system according to an embodiment of the present invention.

In FIG. 13, a schematic view of a medical analysis system 13, in particular a MSI prediction system is shown. The MSI prediction system 13 comprises an image generation device 14 for generation of whole slide images WSI of tissue image data TID. Part of the MSI prediction system 13 is also a segmentation device 15, comprising an AI-based model. The AI-based model is trained by training data WSI generated using the annotation assistance device 10 shown in FIG. 10.

The MSI prediction system 13 also includes an analysis device 16, including a tile selection device 16a. The tile selection device 16a selects tiles T of a segmented whole slide image WSI. Further, the analysis device 16 also comprises an MSI prediction device 16b which predicts an MSI-value MSI based on an AI-based separate analysis of the individual selected tiles T of a segmented whole slide image WSI.

Further, the use of the undefined article "a" or "one" does not exclude that the referred features can also be present several times. Likewise, the term "unit" or "device" does not exclude that it consists of several components, which may also be spatially distributed.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Bluray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The above descriptions are merely preferred embodiments of the present disclosure, but not intended to limit the present disclosure, and any modifications, equivalent replacements, improvements, etc. made within the spirit and principle of the present disclosure should be included within the scope of protection of the present disclosure.

What is claimed is:

1. A method for AI-assisted generation of annotated medical images, the method comprising:
   receiving a set of pre-annotated medical images, a subset of the set of pre-annotated medical images being coarsely annotated by a first human expert;
   processing the set of pre-annotated medical images by automatically training an AI-based uncertainty model using the set of pre-annotated medical images as training data,
      processing medical images of the set of pre-annotated medical images by determining at least one of classified segments or uncertainty regions in the medical images using the trained AI-based uncertainty model,
      selecting at least a part of the processed medical images including the at least one of the classified segments or the uncertainty regions based on the processing, and
      presenting the part of the processed medical images to a second human expert; and
   receiving a modified set of pre-annotated medical images including additional annotations created by the second human expert, wherein the additional annotations are related to the part of the processed medical images.

2. The method according to claim 1, wherein at least one of:
   the medical images include whole slide images,
   the AI-based uncertainty model includes an AI-based Bayesian segmentation model, or
   the selecting of the at least the part of the processed medical images is performed based on a ranking of the at least one of the classified segments or the uncertainty regions.

3. The method according to claim 1, wherein at least the part of the set of pre-annotated medical images are coarsely segmented based on at least one of a line or a closed curve within the set of pre-annotated medical images.

4. The method according to claim 3, wherein the at least one of the line or the closed curve is at least one of piecewise linear or piecewise polynomial.

5. The method according to claim 1, further comprising:
   determining the classified segments, the determining of the classified segments including refining a segmentation of coarsely annotated medical images by the first human expert.

6. The method according to claim 1, wherein the processing the set of pre-annotated medical images and the receiving the modified set of pre-annotated medical images are repeated iteratively using the modified set of pre-annotated medical images as the training data in the training of the AI-based uncertainty model.

7. The method according to claim 6, wherein the training of the AI-based uncertainty model, the processing of the medical images of the set of pre-annotated medical images, and the selecting at least the part of the processed medical images are repeated iteratively, until a quality criteria for the annotated medical images is achieved.

8. The method according to claim 1, further comprising:
   determining the uncertainty regions using the trained AI-based uncertainty model; and wherein
   the determining of the at least one of the classified segments or the uncertainty regions includes
      generating a simplified graphical representation of the uncertainty regions, and
      extracting the simplified graphical representation for presentation to the second human expert.

9. The method according to claim 8, wherein the simplified graphical representation includes at least one of:
   a point set based representation, or
   a parameter based representation.

10. The method according to claim 2, wherein the selecting of at least the part of the processed medical images is based on a ranking of the at least one of the classified segments or the uncertainty regions, and wherein the ranking is based on a determination of a preferred type of the at least one of the classified segments or the uncertainty regions.

11. The method according to claim 10, wherein the preferred type includes at least one of:
   an image structure systematically neglected by a coarse annotation,
   a high uncertainty,
   assigned metadata revealing a type of rarely collected medical images, or
   image features revealing dissimilar medical images.

12. The method according to claim 1, wherein the AI-based uncertainty model comprises at least one of:
   a specialized spatial segmentation loss algorithm,
   a feature pyramid pooling algorithm,
   a Monte Carlo Dropout algorithm,
   a Monte Carlo Depth algorithm, or
   a Deep Ensemble algorithm.

13. The method according to claim 1, wherein at least one of the AI-based uncertainty model or an AI-based segmentation model is trained based on the modified set of pre-annotated medical images.

14. A computer-implemented method for providing a segmented medical image, computer-implemented method comprising:
   receiving a generated medical image;
   determining a segmented medical image by processing the generated medical image by a trained AI-based segmentation model provided by the method according to claim 13; and
   providing the segmented medical image.

15. A non-transitory computer-readable medium storing computer-executable instructions that, when executed at a computer, cause the computer to perform the method of claim 14.

16. A non-transitory computer-readable medium storing computer-executable instructions that, when executed at a computer, cause the computer to perform the method of claim 1.

17. The method according to claim 4, wherein the processing the set of pre-annotated medical images and the receiving a modified set of pre-annotated medical images are repeated iteratively using the modified set of pre-annotated medical images as the training data in the training of the AI-based uncertainty model.

18. The method of claim 7, wherein the quality criteria is met when a first modified set of pre-annotated medical images from a first iteration is less than a threshold difference from a second modified set of pre-annotated medical images from a second iteration after the first iteration.

19. An annotation assistance device, comprising:

a communication interface configured to receive a set of pre-annotated medical images;

a model training unit configured to train an AI-based uncertainty model using the set of pre-annotated medical images as training data, a subset of the set of pre-annotated medical images being coarsely annotated by a first human expert;

a processing unit configured to determine at least one of classified segments or uncertainty regions in medical images of the set of pre-annotated medical images using the trained AI-based uncertainty model; and a selection unit configured to select at least a part of the medical images including the at least one of the classified segments or the uncertainty regions, wherein the communication interface is configured to present the part of the medical images to a second human expert, and receive a modified set of pre-annotated medical images including additional annotations created by the second human expert, the additional annotations being related to the part of the medical images.

20. An annotation assistance device, comprising:

at least one processor configured to execute computer-executable instructions to cause the annotation assistance device to train an AI-based uncertainty model using a set of pre-annotated medical images as training data, a subset of the set of pre-annotated medical images being coarsely annotated by a first human expert, determine at least one of classified segments or uncertainty regions in medical images of the set of pre-annotated medical images using the trained AI-based uncertainty model, select at least a part of the medical images including the at least one of the classified segments or the uncertainty regions, present the part of the medical images to a second human expert, and receive a modified set of pre-annotated medical images including additional annotations created by the second human expert, the additional annotations being related to the part of the medical images.

\* \* \* \* \*